US010418906B2

(12) United States Patent
Yang

(10) Patent No.: US 10,418,906 B2
(45) Date of Patent: Sep. 17, 2019

(54) HIGH EFFICIENCY PRIMARY AND SECONDARY BIAS FLYBACK CONVERTER WITH DUAL OUTPUTS

(71) Applicant: Apple Inc., Cupertino, CA (US)

(72) Inventor: Zaohong Yang, Plano, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/177,998

(22) Filed: Jun. 9, 2016

(65) Prior Publication Data

US 2017/0093289 A1 Mar. 30, 2017

Related U.S. Application Data

(60) Provisional application No. 62/234,872, filed on Sep. 30, 2015.

(51) Int. Cl.
*H02M 3/335* (2006.01)

(52) U.S. Cl.
CPC ... *H02M 3/33507* (2013.01); *H02M 3/33592* (2013.01)

(58) Field of Classification Search
CPC ......... H02M 3/33507; H02M 3/33523; H02M 2001/0048; H02M 3/33561
See application file for complete search history.

(56) References Cited

U.S. PATENT DOCUMENTS

| | | | |
|---|---|---|---|
| 6,188,593 B1 | 2/2001 | Gruwe | |
| 8,159,837 B2 | 4/2012 | Dishman | |
| 8,638,578 B2 * | 1/2014 | Zhang | H02M 1/4225 323/228 |
| 8,971,060 B2 | 3/2015 | Wu | |
| 9,246,391 B2 * | 1/2016 | Berghegger | H02M 3/33507 |
| 2005/0254266 A1 * | 11/2005 | Jitaru | H02M 3/33523 363/16 |
| 2010/0194367 A1 * | 8/2010 | Lund | H02M 3/33523 323/284 |
| 2012/0069609 A1 * | 3/2012 | Christophe | H02M 3/33523 363/21.12 |
| 2014/0268915 A1 * | 9/2014 | Kong | H02M 3/33592 363/21.14 |
| 2016/0036339 A1 * | 2/2016 | Kikuchi | H02M 3/33592 363/21.14 |
| 2017/0163161 A1 * | 6/2017 | Kojima | H02M 3/33523 |

* cited by examiner

*Primary Examiner* — Adolf D Berhane
*Assistant Examiner* — Jye-June Lee
(74) *Attorney, Agent, or Firm* — Blank Rome LLP

(57) ABSTRACT

This disclosure relates to flyback transformer-based power converters that are capable of providing multiple output voltage levels. With respect to USB-PD adapter design, the flyback converter's output may be changed from 12V to 20V—based on the charging device's request. By using a bias circuit that monitors an output voltage level of the flyback converter, a bias voltage for the bias circuit may be determined to improve efficiency of the flyback converter. Embodiments include a comparator, microcontroller or switches to compare output voltage levels and provide bias voltages to the bias circuit.

18 Claims, 12 Drawing Sheets

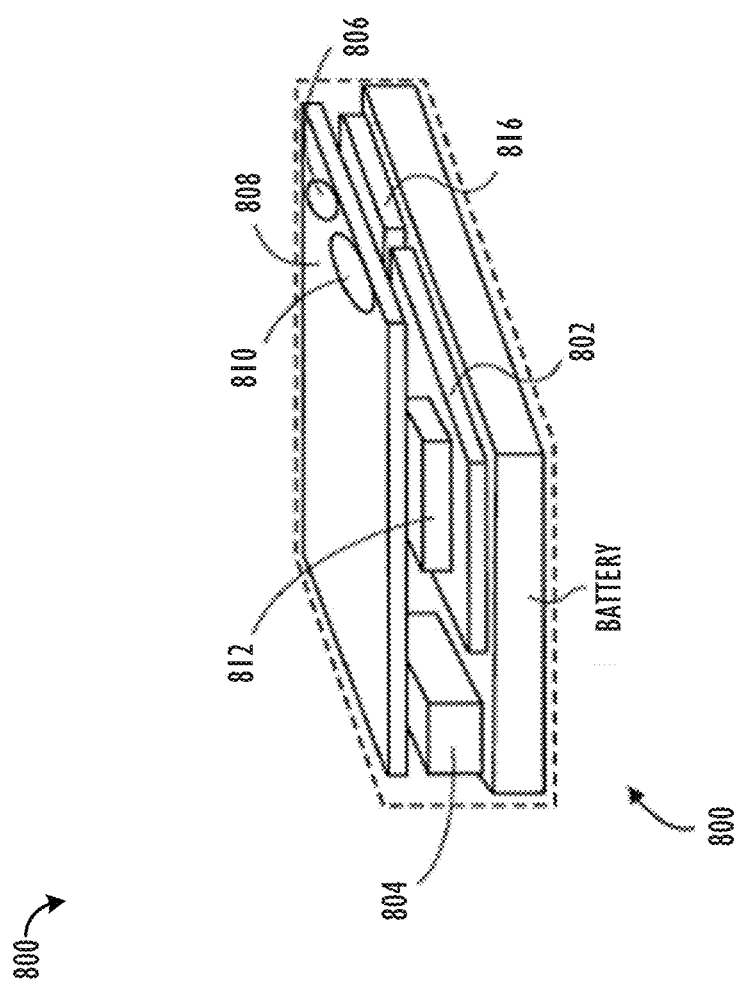

HIGH EFFICIENCY PRIMARY AND SECONDARY BIAS FLYBACK CONVERTER WITH DUAL OUTPUTS

BACKGROUND

This disclosure relates generally to flyback converter-based power converters that are capable of providing multiple output voltage levels in an efficient manner. Other embodiments are also described herein.

Alternating current (AC) power is typically supplied from wall outlets and is sometimes referred to as line power. Electronic devices often include circuitry that runs from direct current (DC) power. AC to DC power converter circuitry can be used to convert AC power to DC power. The DC power may be used to power an electronic device that runs on DC power. The DC power may also be used to charge a battery in an electronic device.

AC to DC power converters often include transformers. A transformer in an AC to DC power converter may have primary and secondary windings. A pulse width modulation (PWM) circuit on the primary side of a transformer may generate pulses of current that pass through the primary winding of the transformer. On the secondary side of the transformer, a diode may be used to rectify the output of the secondary winding.

Some AC to DC power converter circuits use synchronous rectifier (SR) output stages. SR output stages may include a metal-oxide-semiconductor field-effect transistor (MOSFET). The MOSFET is driven so as to rectify the output waveform from the transformer in the same way that the diode is used in other power converter designs, while avoiding high diode voltage drops when conducting current (e.g., ~0.7V).

Certain power converter designs may have potential drawbacks. One drawback is that different electronic devices may have different voltage requirements. Bias circuits that supply bias voltages are designed at a particular operating voltage. Efficient operation at one level may result in inefficient operation at another level since the topology of the bias circuit cannot change.

To attempt to deal with some of these drawbacks, some power converters may use bias circuits to control primary side and secondary side circuits. These bias circuits use voltages from one or more auxiliary transformer windings to generate control voltages to the primary and secondary side circuits. However, such configurations can result in inefficient operation in power converters that produce multiple output voltages.

SUMMARY

Described herein are various devices and methods for operating improved flyback converters in which a transformer with a tapped secondary winding is used, along with one or more switching devices, to control the duty cycle and perform synchronous rectification.

Flyback converters with a wide range of potential output voltages may be applicable in a number of power conversion contexts. For example, they may be particularly applicable in the context of the new Universal Serial Bus-Power Delivery ("USB-PD") standard. The USB-PD industry standard is designed to be adaptable enough to be used for charging and data transfer to and from any device over a single cable. Because a wider range of devices will soon support the USB-PD standard, users will desire to use the same power adapter to charge all of their USB-PD compatible devices. For power adapters designed to work with the USB-PD standard, the flyback output of the adapter may need to be changed over a wide range of output voltages, based on the charging device's request.

The dual output voltage requirement (e.g., 12V and 20V) from a 120 VAC voltage makes it very difficult to provide efficient operation of the flyback converter at both output voltage levels for USB-PD compatible devices. According to some embodiments, using a secondary bias circuit that has a comparator to monitor an output voltage of 12V or 20V of the flyback converter, the secondary bias voltage can be selected at a level that improves the overall efficiency of design. In one embodiment, a comparator compares a reference voltage at a non-inverting input with an inverting input that senses the output voltage so as to provide either a high output voltage level at its output or a low output voltage level at the output. The output voltage of the comparator can be used to either turn ON or turn OFF a switch connected to the output of the comparator. According to some embodiments disclosed herein, comparison of the output voltage with a reference voltage can be performed with a microcontroller or other switch(es) in lieu of a comparator. Such embodiments may include an auxiliary winding on the transformer that can be used as a primary bias voltage when the voltage level of the output is at 20V.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above Summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness, a given figure may be used to illustrate the features of more than one embodiment of the invention, or more than one species of the invention, and not all elements in the figure may be required for a given embodiment or species.

FIG. 8 is a block diagram of a portable device in which a flyback converter circuit can be used in accordance with one embodiment.

DETAILED DESCRIPTION

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

Figure 1:
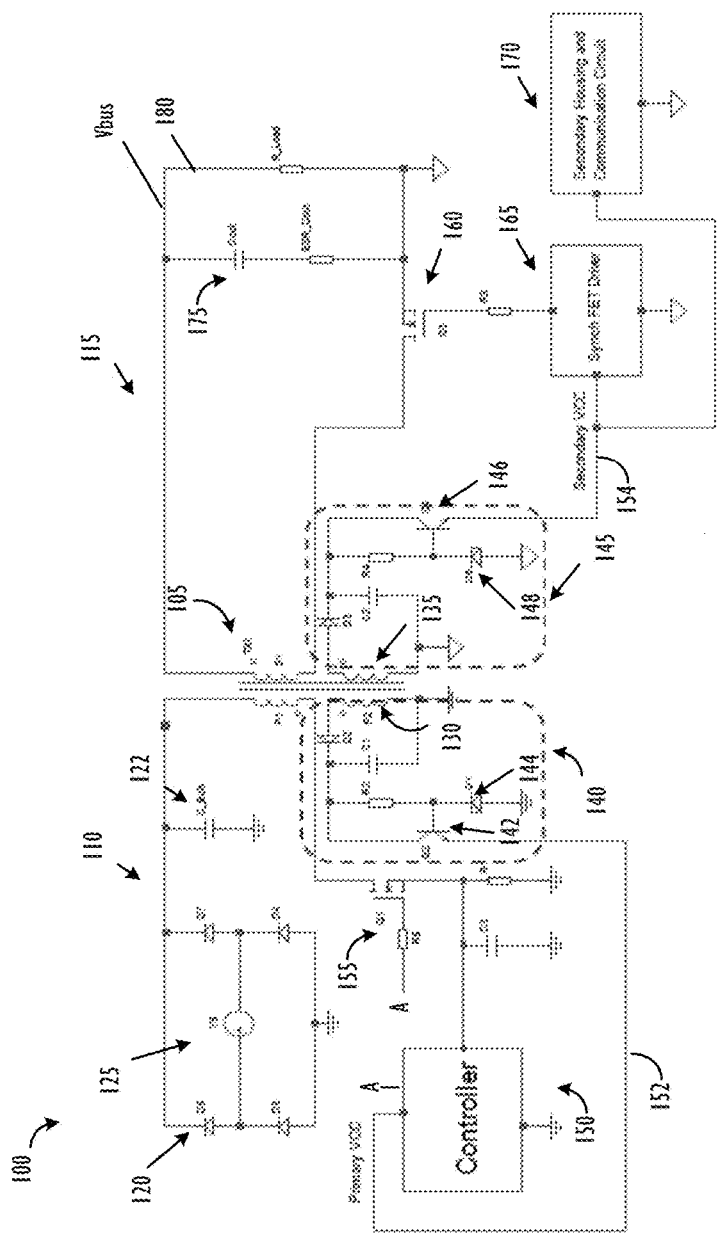
FIG. 1 illustrates a conventional flyback converter circuit.

Turning now to FIG. 1, a conventional AC/DC flyback converter circuit 100 is shown. Flyback converter circuit 100 is a single stage dual-output flyback converter for providing dual Direct Current ("DC") outputs such as, for example, 12 Volts and 20 Volts to an output load. Flyback converter circuit 100 has a transformer 105 with a primary winding P1 (i.e., to the left of transformer 105) and a secondary winding S1 (i.e., to the right of transformer 105). Primary winding P1 is electrically connected to a primary side circuit 110 and secondary winding S1 is electrically connected to secondary side circuit 115.

Primary side circuit 110 includes rectifier network 120, a primary bias circuit 140, a controller 150 and a primary switching mechanism Q1 or (switch 155). An input power source 125, for example, power mains that provides Alternating Current ("AC") power (e.g., a 120 Volt-AC or "120 VAC") is electrically connected to rectifier network 120 to generate a rectified voltage. Rectifier network 120 can be a full-bridge diode rectifier. The rectified voltage from rectifier 120 is applied to the primary winding P1 of the transformer 105 via smoothing capacitor 122 using switching mechanism 155. Switching mechanism 155, which can be a P-FET, N-FET, or any other suitable power switch, may be controlled at node A from controller 150 in order to control the duty cycle of the flyback converter 100 that is the amount of time during which the primary winding P1 of transformer 105 (i.e., the left side, as shown in FIG. 1) is connected to the primary side input power source 125 (during which time energy is stored in the primary winding P1 of the transformer 105).

Transformer 105 also includes a primary auxiliary winding 130 and a secondary auxiliary winding 135. Secondary auxiliary winding 135 and primary auxiliary winding 130 are designed with a turns ratio that provides a predetermined or calculated voltage on secondary auxiliary winding 135 using energy stored in primary auxiliary winding 130. A primary bias circuit 140 includes a diode and linear regulator (e.g., switch 142 and Zener diode D1 144) that is connected to the auxiliary winding 130. The primary bias circuit 140 receives pulsating energy stored in the primary auxiliary winding 130. The energy, in the form of a voltage is rectified through the diode 144 and regulated through a linear regulator circuit to provide a fixed DC bias voltage (e.g., primary VCC) to controller 150 on line 152. Bias voltage VCC provided to controller 150 may be used to control the gate contact of switch Q1 (155).

Also shown in FIG. 1, a secondary side circuit 115 includes a secondary bias circuit 145, switching mechanism 160 (or switch 160), FET driver 165 and Housing and communication circuits 170. Secondary bias circuit 145 is substantially similar to primary bias circuit 140 and a diode and linear regulator (e.g., switch 146 and Zener diode D8 148) that is connected to the secondary auxiliary winding 135. The secondary bias circuit 145 receives energy stored in the secondary auxiliary winding 135. The energy, in the form of a voltage is rectified through the diode and regulated through a linear regulator circuit to provide a fixed DC bias voltage (e.g., secondary VCC) on line 154. The DC voltage on line 154 is provided to FET Driver 165 and Communication Circuit 170. Bias voltage VCC provided to Driver 165 may be used to control the gate contact of switch Q3 (160). Communication circuit 170 includes circuits for handshaking and/or communicating with devices connected to converter circuit 100 as load devices. The circuit 170 transmits output voltage and signals to devices connected to load. Communication circuits 170 also include overcurrent and overvoltage protection circuits.

During operation of converter circuit 100, when the switch Q1 155 is closed, the primary winding P1 of the transformer 105 is directly connected to the input voltage source 125. The primary current and magnetic flux in the transformer 105 increases, thereby storing energy in the transformer 105. A voltage may also be induced in the secondary winding S1 of the transformer 105. Switch 160, which may, e.g., be a N-FET, may be used to connect the secondary winding S1 of transformer 105 to secondary side circuit 115 allowing current to flow from the transformer 105 to the output load and output capacitor 175. Turning ON switch 160 closes the secondary circuit and causes the energy of the secondary winding to charge the output capacitor 175 and supply energy to the output load. The output voltage, Vout, may be measured at point 180 on Vbus. The energy from the transformer core thus recharges the capacitor and supplies power to the secondary system load. Further, auxiliary windings 130 and 135 are also energized to supply energy to primary and secondary bias circuits 140, 145. Primary and secondary bias circuit 140, 145 may convert the energy to provide a fixed DC bias voltage to a controller 150, on primary side circuit 110 and driver 165, on secondary side circuit 115 in order to drive respective switches 155, 160.

Some of the challenges associated with the design of the flyback converter circuit 100 of FIG. 1 include limiting power losses in the circuit 100 when output voltage on Vbus varies between the dual outputs of 12 V and 20 V. As output voltage is switched between 12 Volt (hereinafter "V") and 20 V, the auxiliary winding voltages also change due to the turns ratio. Changing the auxiliary winding voltages results in increased power dissipation losses in the bias circuits and degradation in the efficiency of the flyback converter circuit 100.

Figure 2:
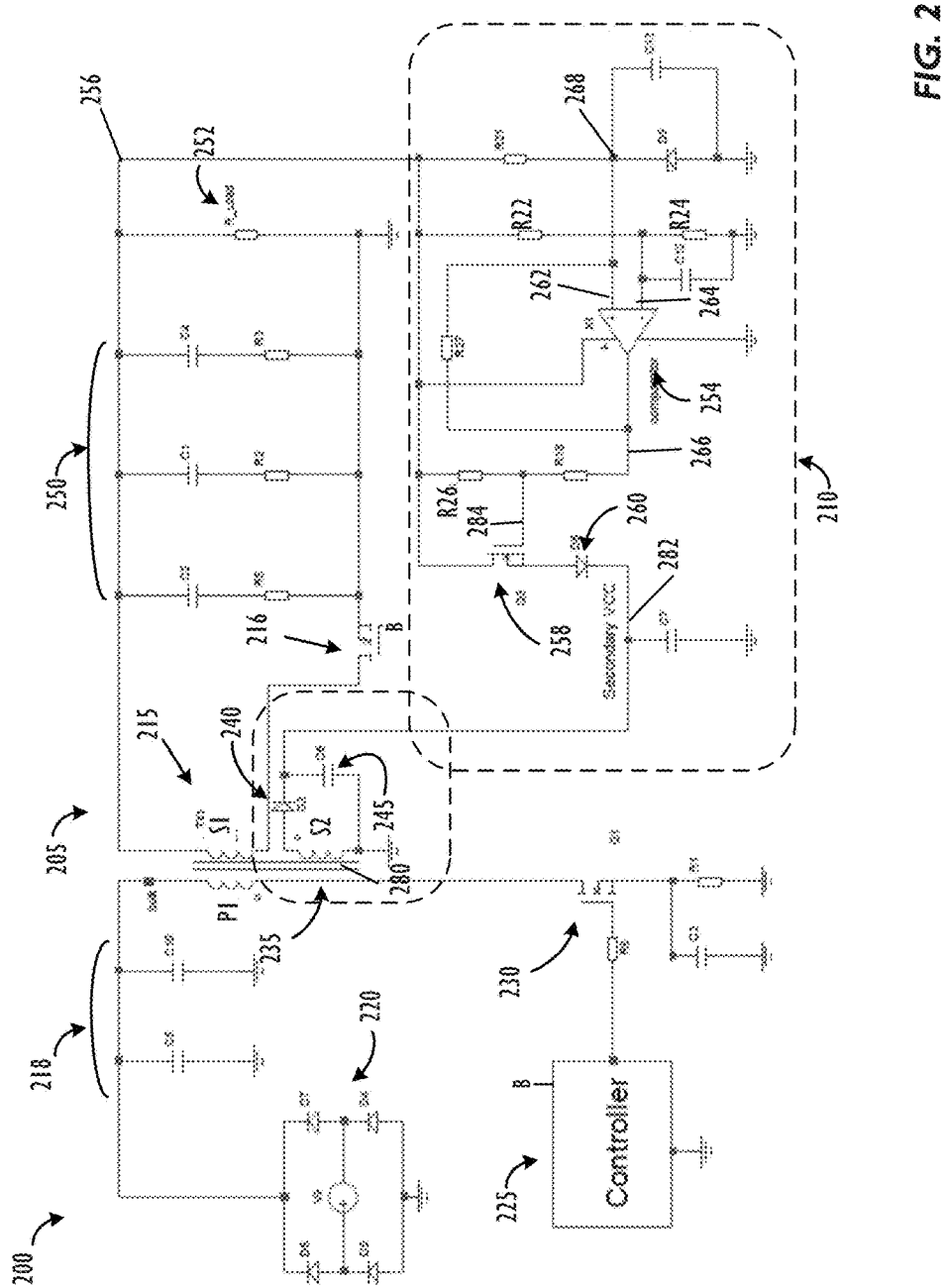
FIG. 2 illustrates a dual-output flyback converter circuit with a secondary bias circuit in accordance with one embodiment.

Turning now to FIG. 2, the conventional flyback converter circuit 100 of FIG. 1 has been modified to overcome some of its drawbacks in the form of an AC/DC flyback power converter circuit 200. The flyback power converter circuit 200 includes a flyback converter 205 that can provide an output load voltage of either 12V DC or 20 V DC voltage while improving efficiency by at least 5% at light load. The power converter circuit 200 includes a comparator 254 in a secondary bias circuit that monitors output voltage and controls a bias on an auxiliary winding of a flyback transformer 215 using the monitored output voltage, while other circuits depicted in FIG. 1 are not shown for clarity such as, for example, a communication circuit 170. Flyback circuit 200 may also include the communication circuit 170 of FIG. 1 for providing handshaking between the circuit 200 and an external device such as, for example, external or output load 252.

As shown in FIG. 2, flyback converter circuit 200 includes a primary side circuit including a rectifier 220 (e.g., a full-bridge diode rectifier), smoothing capacitors 218, switch 230 and controller 225. In the illustrated embodiment, rectifier 220 rectifies AC voltage (e.g., 120 VAC) using full-bridge rectification. In another embodiment, a half-bridge rectifier may be used as rectifier 220. The rectified voltage may be provided to a primary winding (i.e., the left side winding of transformer 215, as shown in FIG. 2) through one or more smoothing capacitors 218. A switch 230 connected to the primary winding may receive a controlling voltage from controller 225 to close the primary side circuit and directly connect the primary winding to the rectifier 220. Switch 230, which may comprise a P-FET, N-FET, or any other suitable power switch, and may control the duty cycle of the flyback converter 200; that is, the amount of time during which the primary winding P1 of transformer 215 (i.e., the left side, as shown in FIG. 2) is connected to the primary side input rectifier 220 using, for example, a pulse width modulated signal, e.g., a PWM signal, thus storing energy in the primary winding P1 of the transformer 215.

Illustrative flyback transformer 215 includes primary and secondary windings and an auxiliary winding. The turns ratio between the windings can be selected to generate winding voltages on each of the secondary winding and the auxiliary winding of transformer 215. In an embodiment, the turns ratio of the auxiliary winding may be selected to generate 7.5 Volts at point 280 when a 12 Volt output voltage at the load is generated and to generate 13 Volts at point 280 when a 20V output voltage at the load is generated. The secondary winding (i.e., the right side winding shown in FIG. 2) of transformer 215 may be connected to a switch 216 and one or more ripple filtering capacitors 250. In addition, the circuit 250 may be connected to an output load 252 through the secondary winding. Switch 216 may receive a controlling voltage from a controller (not shown) in order to close the secondary side circuit and directly connect the secondary winding to the output load 252. Closing the secondary switch 216 with a control signal at node B provides an output voltage to a load 252 at line 256 that may be connected to the circuit 200. In an embodiment, the primary winding may be controlled to provide dual-output DC voltages at line 256. In one non-limiting example, the output voltage provided at line 256 can be either a 12V DC output or a 20V DC output.

Secondary side circuit also includes a secondary bias circuit 210 having a comparator 254, switch 258 electrically connected to a diode D3 240 and capacitor 245. The comparator 254 includes a non-inverting input 262 that may be connected to a Zener diode D9, measured at line 268, which is the reference voltage of the comparator 254. An inverting input 264 is connected to Vout at line 256 through a resistor divider of resistors R22 and R24. An output 266 of comparator 254 may be connected to the gate of switch Q3 (258) through resistor R18. Further, drain of switch 258 can be connected to Vout at line 256 and source can be connected to diode D8 (260). The comparator 254 may be configured to monitor an output voltage Vout measured at line 256 and provide a bias voltage (Secondary VCC). A diode 260 may act as a switch between the source terminal of switch 258 and line 282. Line 282 may provide a bias voltage 282 (i.e., secondary voltage VCC) from the secondary auxiliary winding 235 of the flyback transformer 215. Based on a comparison of the non-inverting and inverting inputs 262 and 264, respectively, an output 266 of comparator 254 may provide a driving voltage to the gate (Vgs) of switch 258 (See FIG. 3D) to either turn ON or turn OFF the switch 258.

Figure 3A:
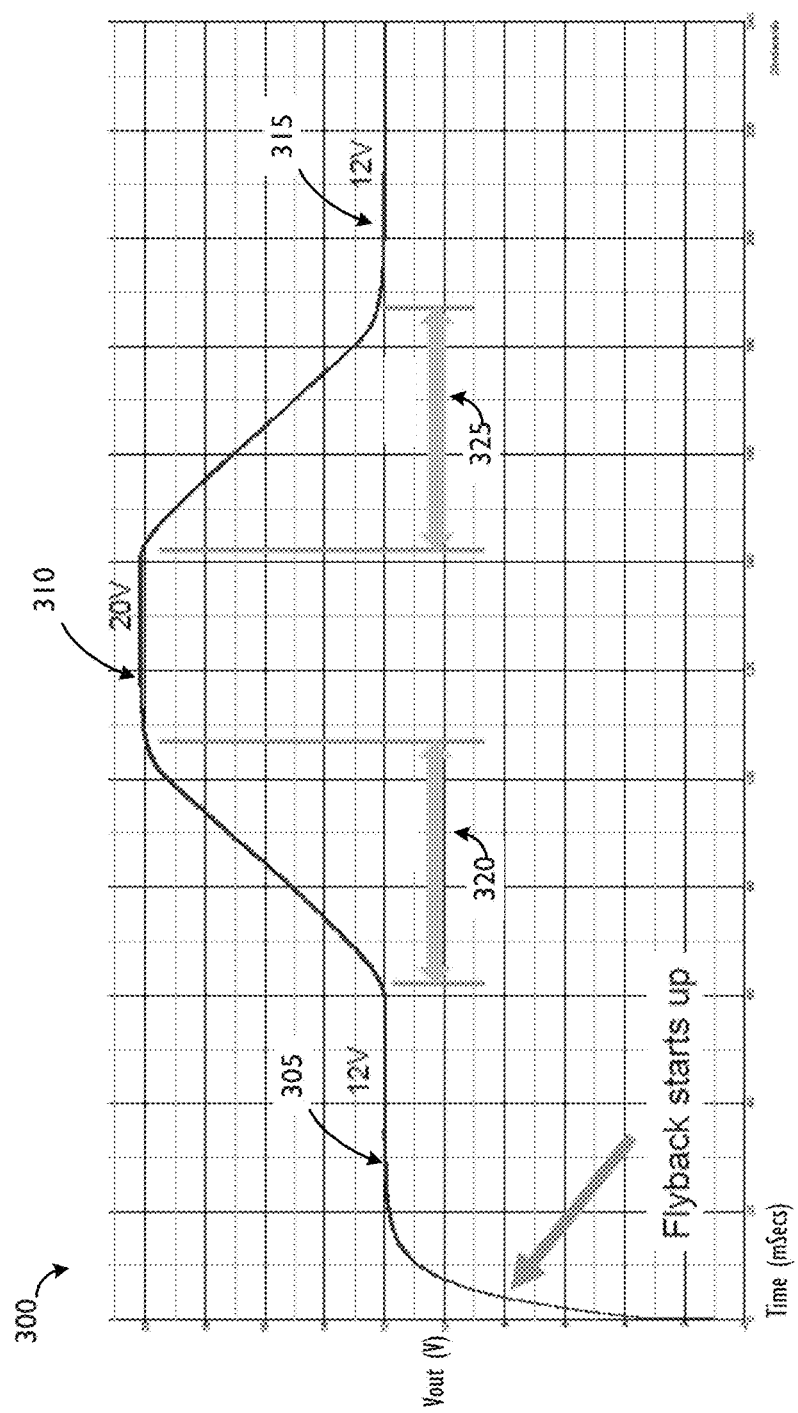
FIG. 3A illustrates a timing diagram for the flyback converter circuit of FIG. 2 and shows a transition time from one voltage level to another voltage level.
Figure 3B:
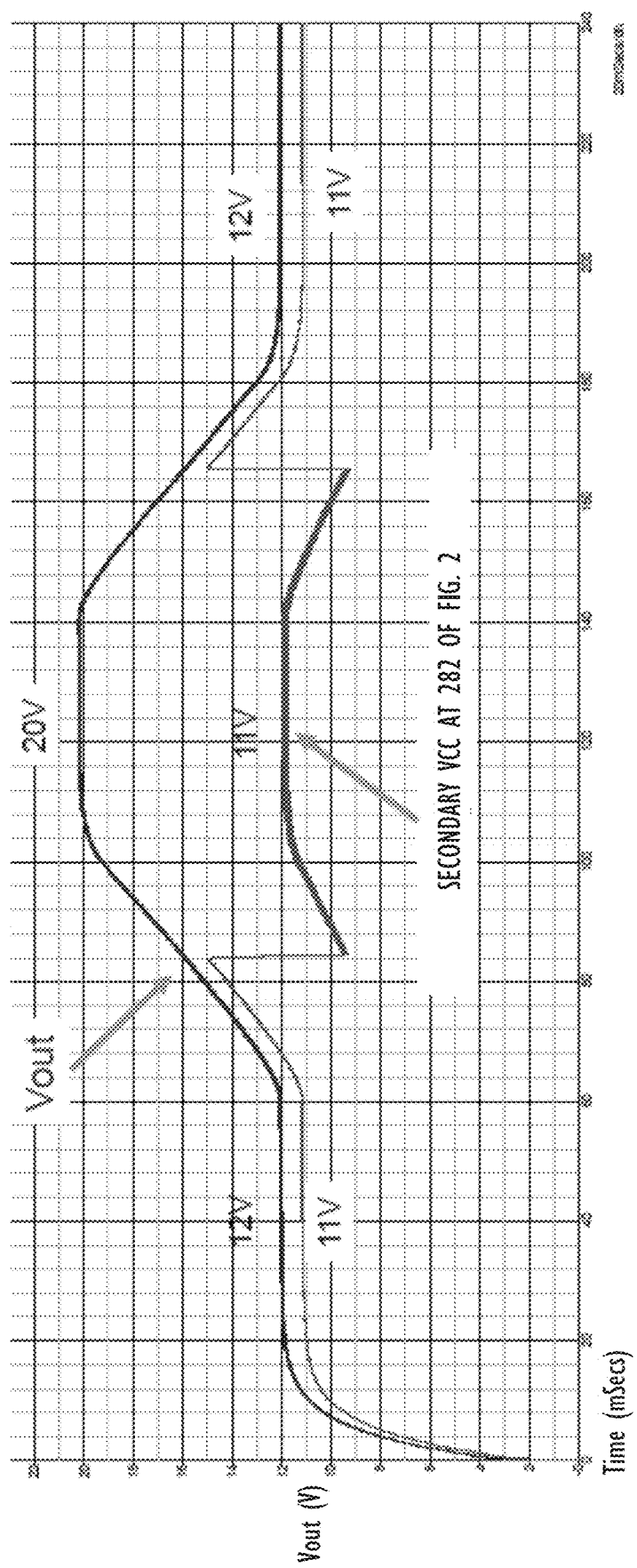
FIG. 3B illustrates a timing diagram showing bias voltages for a secondary bias circuit of the flyback converter of FIG. 2.

FIG. 3A depicts a timing diagram 300 for flyback converter circuit 200 during generation of dual output voltages, for example, during generation of a 12V output 305 or 315 or generation of a 20V output 310. Also shown in the diagram, the flyback converter illustrates a relatively short transition period 320 or 325 while the output voltage is transitioning from 12V to 20V or from 20V to 12V such as, for example, when a 12V device, for example, a tablet computer such as an iPad® from Apple is unplugged from flyback converter 200 and a 20V device, for example, a laptop computer such as a MacBook® from Apple is plugged into converter 200 (IPAD and MACBOOK are registered trademarks of Apple Inc.). The transition period 320 or 325 represents the time period for handshaking that occurs between the communications circuits in the converter and an external device (e.g., represented by load device 252 in FIG. 2).

With reference to FIGS. 2 and 3B-3D, comparator 254 may monitor output voltage of flyback converter circuit 200 and provide control voltages that control switching of the secondary bias circuit 210. In an embodiment, during 12V operation where flyback converter circuit 200 is supplying 12 V DC to line 256 (i.e., Vout=12V), 12V DC may also be supplied to R26, drain of Q3 258, and resistor R21. Voltage at non-inverting input 262 can be, for example, 3.6V from the Zener diode D9 and voltage of inverting input 264 may be given as (Vout×R24)/(R22+R24) (See FIG. 3C). The Resistors R22 and R24 may be selected so that the Voltage at inverting input 264 is approximately 2.6V (See FIG. 3C) for Vout=12V. Since, in such an embodiment, the voltage of non-inverting input 262 (3.6V) is greater than voltage of inverting input 264 (2.6V), comparator output 266 is high, which provides a voltage to gate 284 to turn ON switch 258 and provide approximately 11V to the secondary VCC 282. As VCC 282 of 11V is greater than auxiliary winding voltage 280 of 7.8 V (shown in FIG. 3C), diode D3 240 is reversed biased and does not allow auxiliary winding voltage to be transmitted to secondary VCC 282.

Figure 3C:
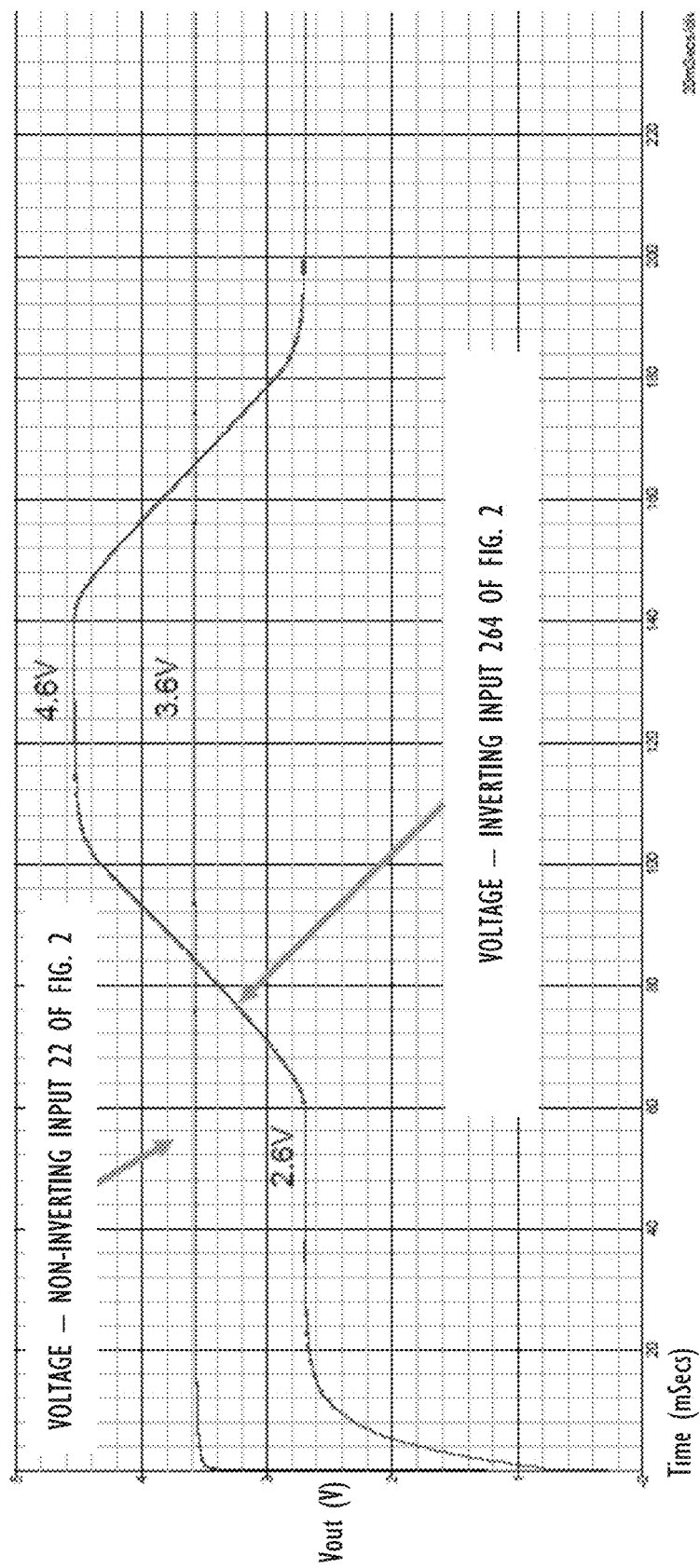
FIG. 3C illustrates a timing diagram showing inverting and non-inverting inputs to a comparator of the flyback converter of FIG. 2.
Figure 3D:
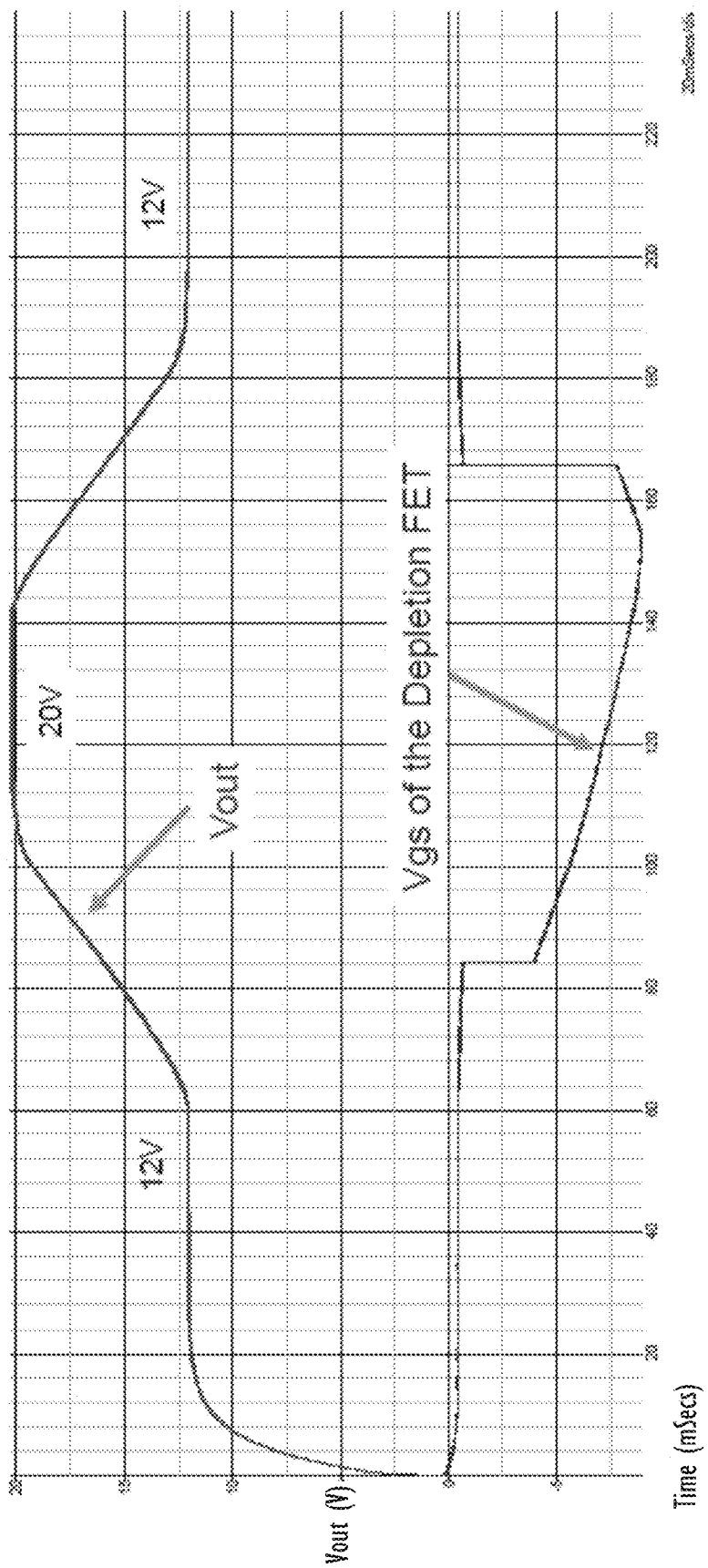
FIG. 3D illustrates a timing diagram showing gate to source voltages for a switch in a secondary bias circuit of FIG. 2 in accordance with one embodiment.
Figure 3E:
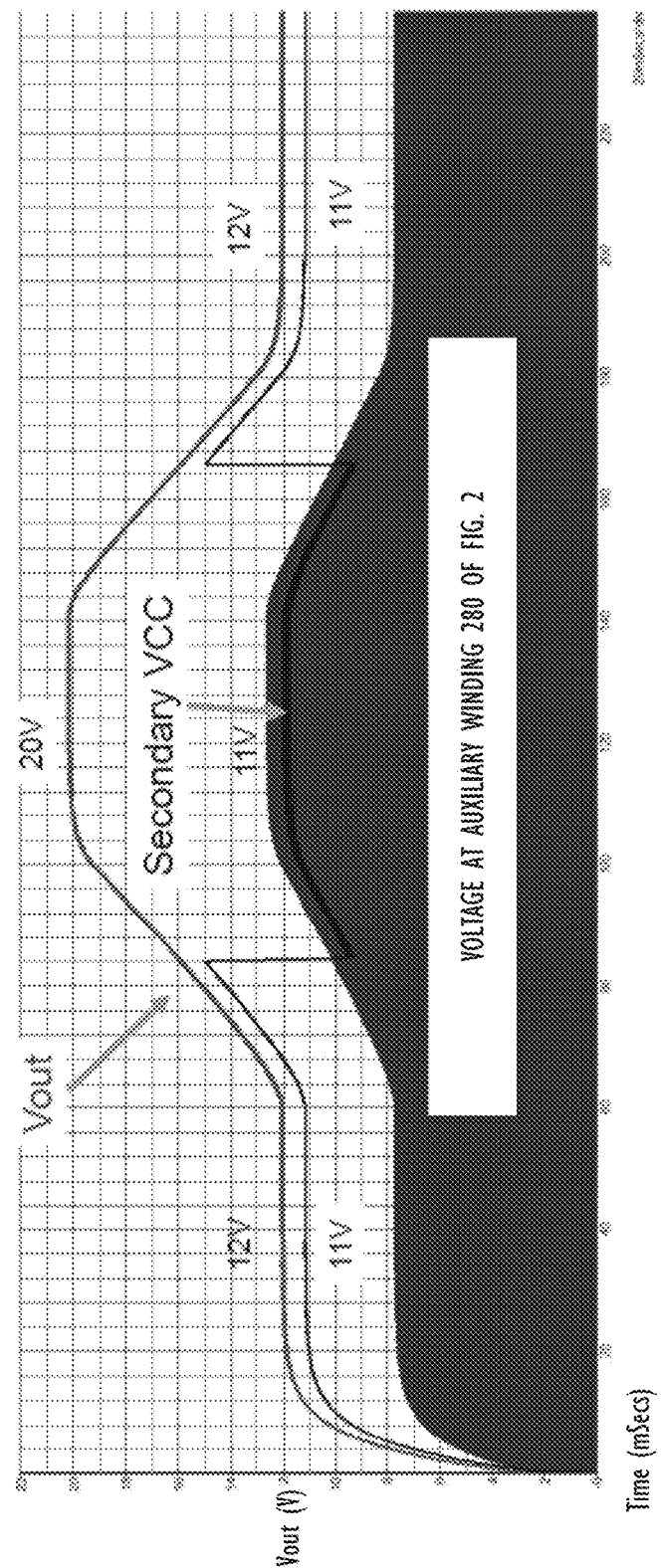
FIG. 3E illustrates a timing diagram showing auxiliary winding voltages for voltage output levels of the a secondary bias circuit of the flyback converter of FIG. 2.

In an embodiment, during 20V operation where flyback converter circuit 200 is supplying a 20V DC to line 256 (i.e., Vout=20V), 20V at line 256 is supplied to R26, Drain of Q3 258, and R21. Voltage at Non-inverting input 262 of comparator 254 is 3.6V from the Zener diode D9. Voltage of inverting input 264 of comparator 254 may be given by (Vout×R24)/(R22+R24) (See FIG. 3C). As shown in FIG. 3C, the voltage at inverting input 264 of comparator 254 is 4.6V for Vout=20V. Since the voltage at non-inverting input 262 (3.6V) is less than the voltage at inverting input 264 (4.6V), the output voltage of comparator 266 is low, which turns OFF the switch 258, causing diode D3 240 to be forward biased (i.e., ON). This, in turn, can cause the auxiliary winding voltage 280, which is a PWM waveform with a peak voltage of 12.5V to be rectified through diode D3 240 and to be applied to the secondary VCC 282.

Figure 4:
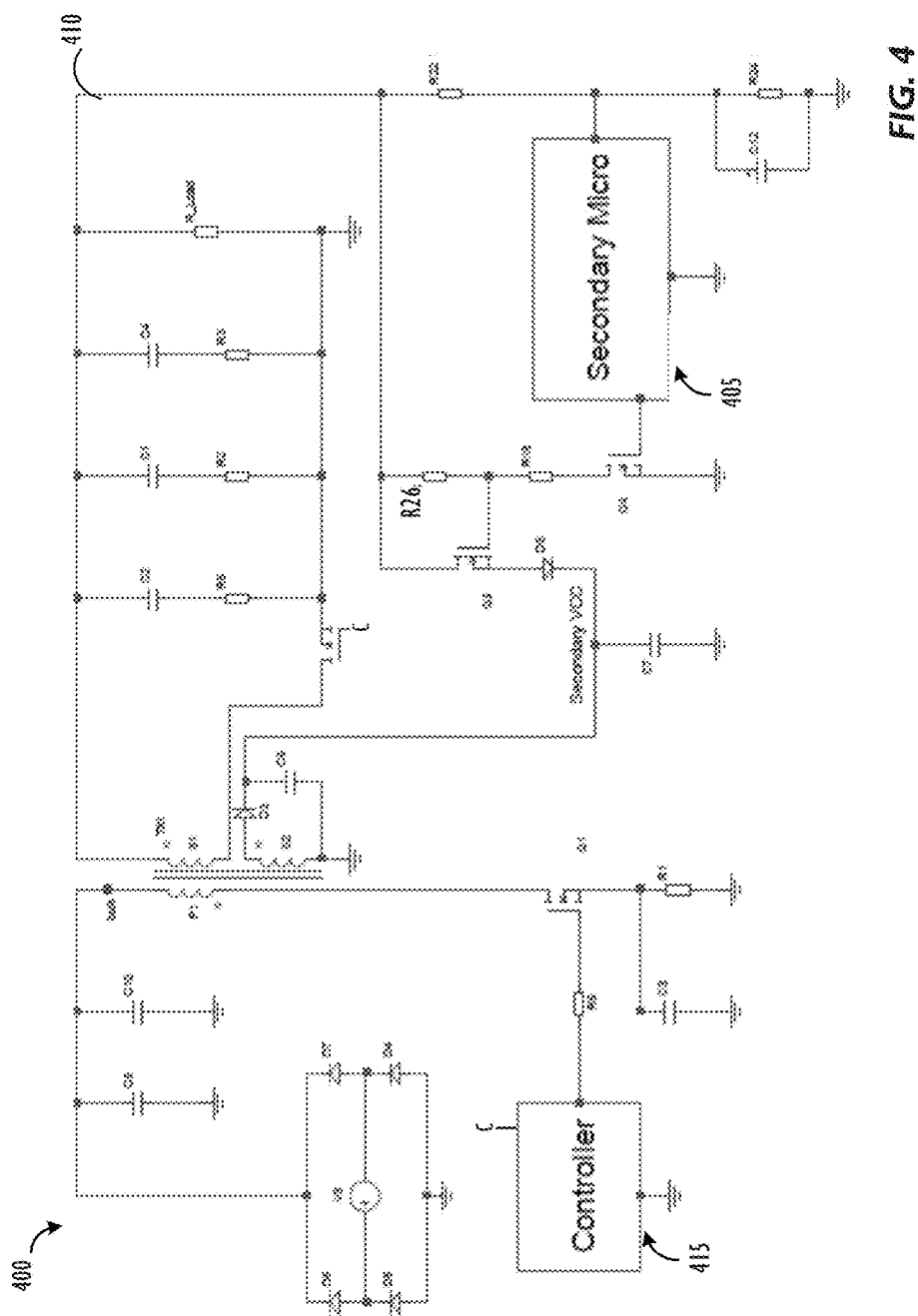
FIG. 4 illustrates a embodiment of a dual-output flyback converter circuit with a secondary microcontroller capable of monitoring an output voltage level of a flyback converter.

FIG. 4 illustrates an embodiment of flyback converter circuit 200 of FIG. 2 where comparator 254 and its associated components such as Zener diode D9, resistors R21, R22 are replaced with a secondary microcontroller 405, while all other features and functions of flyback converter circuit 400 remain substantially the same as flyback converter circuit 200 of FIG. 2. Controller 415 controls switch Q with a driving signal at node C. Microcontroller 405 includes circuits that perform handshaking, overvoltage protection, overcurrent protection, over power protection. Microcontroller 405 also includes a reference that compares the output voltage 410 at the load with a reference voltage. Using a microcontroller 405 saves space in the housing of the flyback converter circuit 400 as well as reduces component count. In operation, when Vout at line 410 is 12V, switch Q3 is turned OFF and when Vout at line 410 is 20V, switch Q3 is turned ON.

Figure 5:
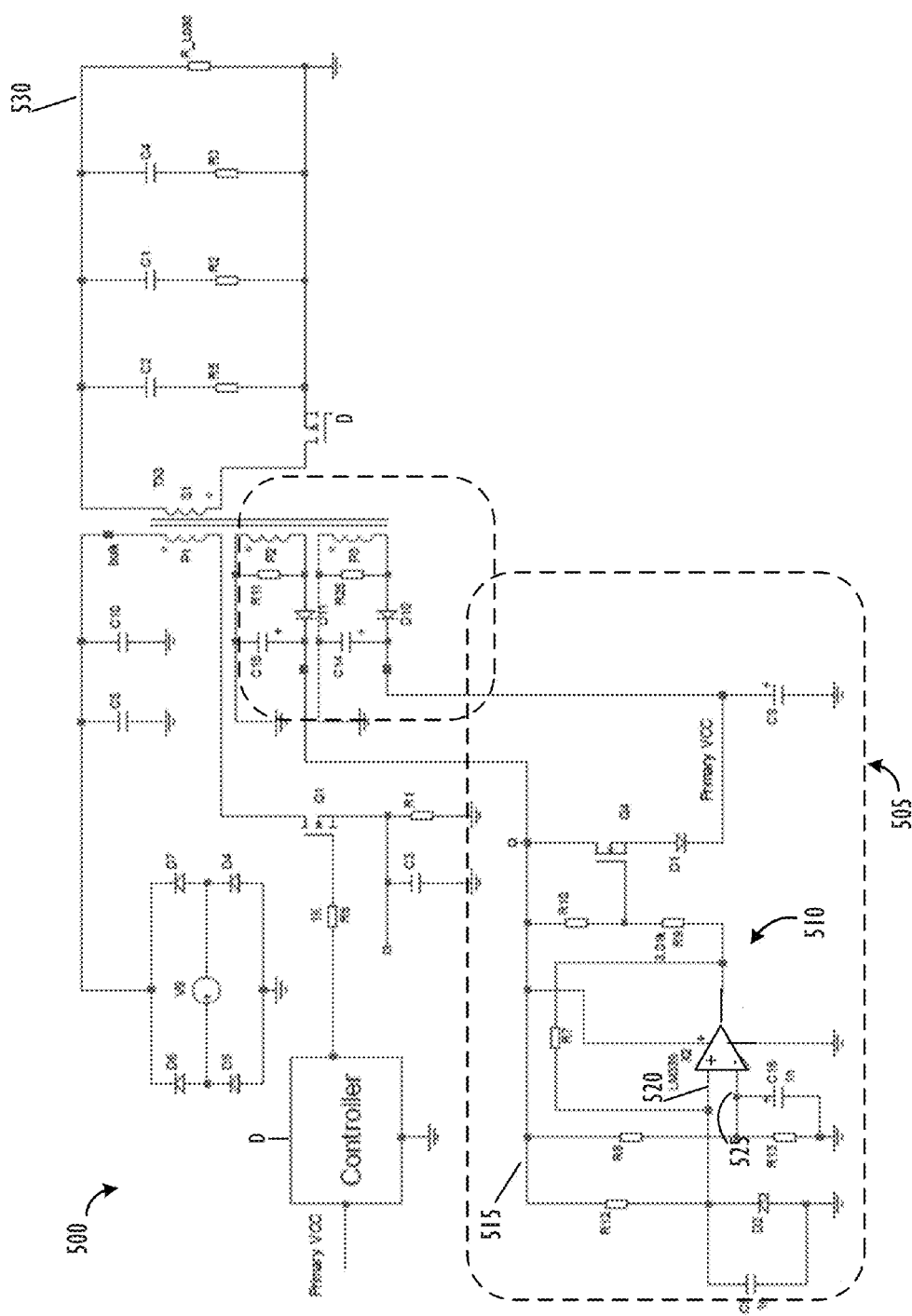
FIG. 5 illustrates a dual-output flyback converter circuit with a primary bias circuit.

FIG. 5 illustrates another embodiment of flyback converter circuit 200 of FIG. 2 where comparator 254 and its associated components such as Zener diode D9, resistors R22, R21, R24 and capacitor C12 in a secondary bias circuit of FIG. 2 are provided by a primary bias circuit 505. The primary bias circuit 505 operates to the flyback converter circuit's 500 efficiency at light loads when compared to conventional flyback converter circuits (e.g., see FIG. 1).

Primary bias circuit 505 can include primary auxiliary windings P2 and P3. The primary auxiliary winding P2 may be used as the primary bias voltage when the output voltage at line 530 is 12V. The second auxiliary winding P3 of the transformer may be used as the primary bias voltage when the flyback converter is producing the second output voltage 20V. In an embodiment, the second auxiliary winding P3 has a smaller number of turns than the first auxiliary winding P2. The amplitude of the voltage provided by P2 is equal to 20V and the amplitude of the voltage provided by P3 is equal to 12V. Similar to the embodiment shown and described in FIG. 2, comparator 510 may monitor voltage on line 515 using resistor divider network formed by resistors R8 and R13 and Zener diode D2. The comparator 510 may compare the non-inverting voltage 520 with the inverting voltage 525 to determine which winding, P2 or P3, to use to provide the primary bias voltage VCC. The primary bias voltage VCC can be approximately 11V for output voltages of 12V and 20V.

Figure 6:
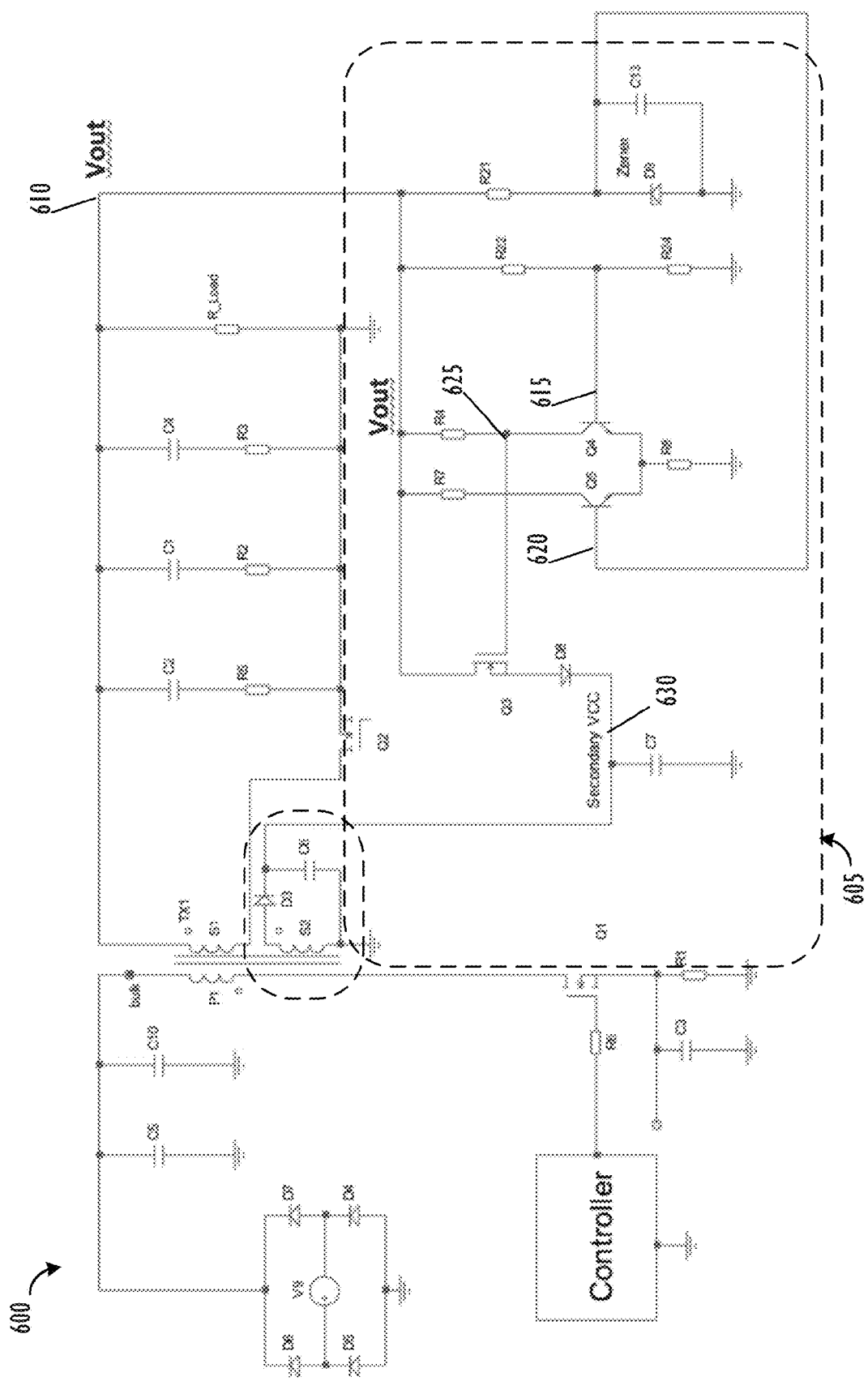
FIG. 6 illustrates an embodiment of a dual-output flyback converter circuit having a secondary bias circuit with back-to-back transistors to monitor output voltage levels of the flyback converter circuit.

FIG. 6 illustrates an embodiment of flyback converter circuit 600 that is similar to the embodiment of flyback converter circuit 200 described in FIG. 2 but with the comparator circuit of FIG. 2 replaced with switching mechanism or switches Q4 and Q5 in the secondary bias circuit 605. Switching mechanism Q4 and Q5, can be a NPN transistor, PNP transistor, or any other suitable power switch. As shown, the base 620 of switch Q5 has a voltage that is set by the Zener diode D9. In an example, the Zener diode has a voltage of approximately 3.6V.

In operation, when the flyback converter output voltage is 12V at line 610, the voltage at the base 615 of the switch Q4 is lower than the voltage at the base 620 of the switch Q5 because of a back-to-back connection of switches Q4 and Q5. As a result, switch Q4 is turned OFF and the collector voltage of switch Q4 at line 625 is high, which provides a gate voltage so as to turn switch Q3 ON. Turning switch Q3 ON causes Vout at line 610 to forward bias diode D8 and reverse block the diode D3 and provide a secondary VCC of approximately 11.3V at line 630.

In addition, when the flyback converter output voltage is 20V at line 610, the voltage of the base 615 of switch Q4 is higher than the voltage of the base 620 of switch Q5 due to the back-to-back connection of switches Q4 and Q5. As a result, switch Q4 is turned ON and the collector voltage at line 625 of switch Q4 is low, turning OFF the switch Q3 and breaking the connection between line 610 and line 630. The secondary VCC is then provided by the voltage of the Auxiliary winding S2 rectified by diode D3 and filtered by the capacitor C6.

Figure 7:
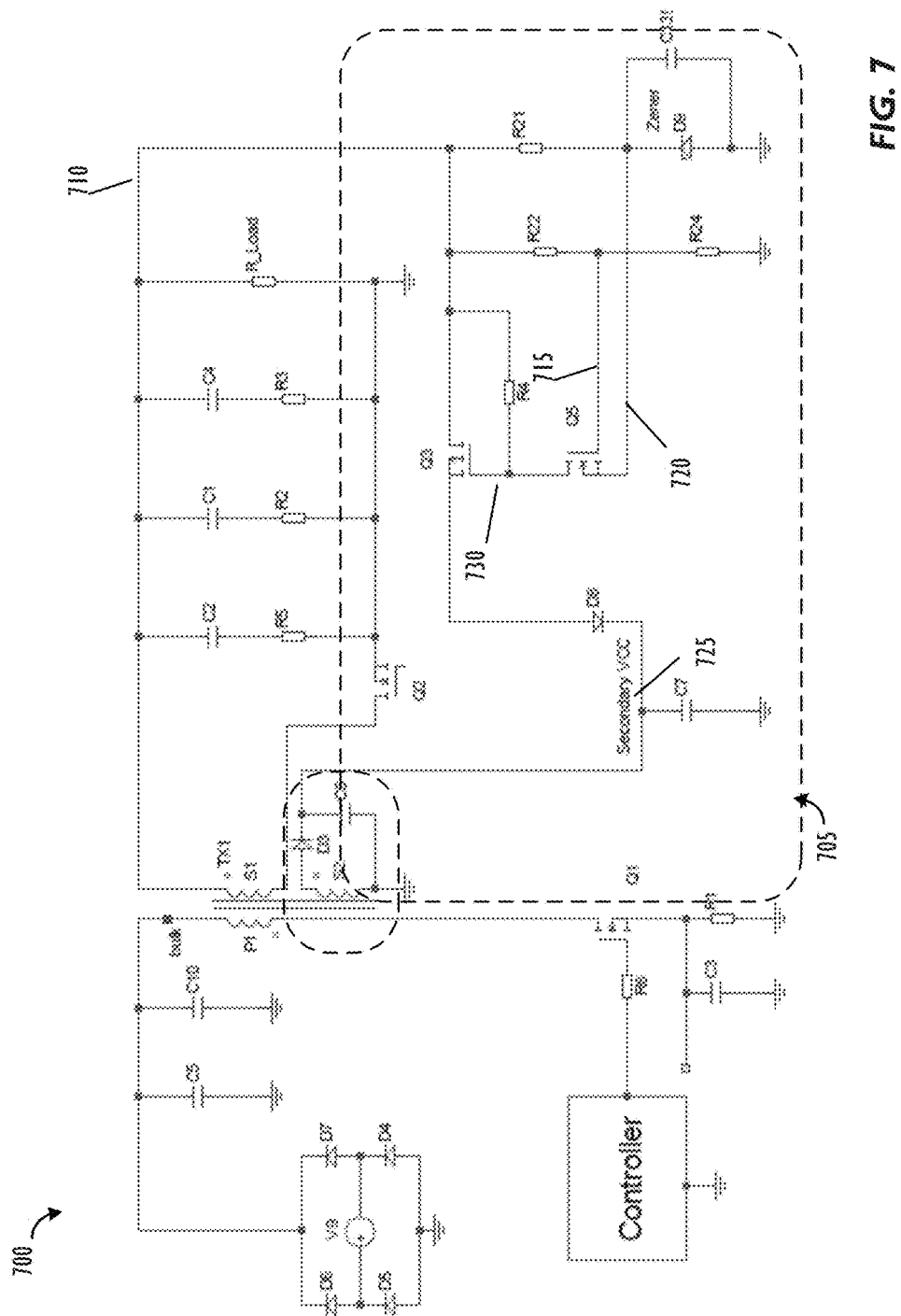
FIG. 7 illustrates an embodiment of a dual-output flyback converter circuit having a secondary bias circuit with the gate (base) and source (emitter) of switches to monitor output voltage levels of the flyback converter circuit.

FIG. 7 illustrates an embodiment of flyback converter circuit 700 that is also similar to the embodiment of flyback converter circuit 200 described in FIG. 2 but with the comparator circuit of FIG. 2 replaced with switching mechanism or switches Q3 and Q5 in the secondary bias circuit 705. Switching mechanism Q3 and Q5, can be a P-FET, N-FET, JFET, or any other suitable power switch.

In operation, when the Flyback converter circuit 700 output voltage at line 710 is 12V, the voltage at the gate 715 of the N-channel MOSFET Q5 is lower than that of the source 720 of the N-channel MOSFET Q5 which is the fixed reference voltage set the by the Zener diode D9. As a result, the switch Q5 is turned OFF and the switch Q3 is fully ON. The diode D3 is reverse blocked. The secondary VCC 725 is provided by the 12V output on line 710.

When the Flyback converter output voltage is 20V at line 710, the voltage of the gate 715 of the N-channel MOSFET Q5 is higher than that of the source 720 of the N-channel MOSFET Q5. As a result, the switch Q5 is turned ON pulling the gate 730 of the switch Q3 to a lower voltage which turns OFF Q3. The secondary VCC 725 is provided by the voltage of the Auxiliary winding S2 rectified by diode D3 and filtered out by the capacitor C6.

Turning now to FIG. 8, an example portable electronic device 800 in which an embodiment of the invention may be implemented is shown. While some of the benefits of the invention are more apparent in such power consumption-sensitive devices, an embodiment of the invention may also find use in non-portable electronic devices, such as desktop computers. The portable device 800 shown has an external or outer housing (shown in dotted lines) in which a number of its constituent sub-systems may be installed, including, in this example, an applications processor 802, a cellular network RF interface 804, a digital camera 806, a touch screen 808 a proximity sensor 810 and an inertial sensor 812. These sub-systems may be found in a typical smart phone or tablet computer that also contains a rechargeable battery 814 to power all of the sub-systems shown. In other portable devices, some of these sub-systems may be absent. One or more of the illustrated sub-systems may be powered by an output node of a power conversion circuit with a flyback converter as described above (e.g., one of nodes 256, 410, 530, 610 and 710).

The power conversion circuit 816 may use a secondary bias circuit that has a comparator to monitor an output voltage of the flyback converter (e.g., 12V or 20V), the secondary bias voltage can be selected at a level that improves the overall efficiency of design at light load conditions. In an embodiment, a comparator compares a reference voltage at a non-inverting input and senses the output voltage at an inverting input to provide either a high output voltage level or a low output voltage level. The output voltage of the comparator can also be used to either turn ON or turn OFF a switch connected to the output of the comparator. According to some embodiments disclosed herein, comparison of the output voltage with a reference voltage can be performed with a microcontroller or other switches in lieu of a comparator. Such embodiments may include an auxiliary winding on the flyback transformer that can be used as a primary bias voltage when the voltage level of the output is set high (e.g., at 20V).

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled.

What is claimed is:

1. A power conversion circuit comprising:
   a flyback transformer including a secondary side with a secondary winding and an auxiliary winding, the flyback transformer configured to generate an auxiliary winding voltage at the auxiliary winding and each of a first flyback output voltage and a second flyback output voltage at an output terminal of the flyback transformer; and
   a secondary bias circuit coupled to the secondary side of the flyback transformer, the secondary bias circuit configured to use the first flyback output voltage as a first bias voltage when the power conversion circuit is generating the first flyback output voltage and further configured to use the auxiliary winding voltage as a second bias voltage when the power conversion circuit is generating the second flyback output voltage.

2. The power conversion circuit of claim 1, wherein the secondary bias circuit comprises a comparator having an inverting input connection and a non-inverting input connection, the comparator configured to:
   receive one of the first flyback output voltage and the second flyback output voltage at the inverting input connection;
   compare one of the first flyback output voltage and the second flyback output voltage with a reference voltage at the non-inverting input connection; and
   output one of a first comparator output voltage and a second comparator output voltage at a comparator output line based on the comparison.

3. The power conversion circuit of claim 2, further comprising a zener diode coupled to the non-inverting input connection of the comparator, the zener diode configured to output the reference voltage at the non-inverting input connection of the comparator.

4. The power conversion circuit of claim 2, further comprising a gate terminal of a switch coupled to the comparator output line, the switch configured to selectively provide the first flyback output voltage as the first bias voltage or the auxiliary winding voltage as the second bias voltage.

5. The power conversion circuit of claim 4, wherein the switch comprises an N-FET, a P-FET, an NPN transistor, a PNP transistor or GaN MOSFET.

6. The power conversion circuit of claim 1, wherein the flyback transformer further comprises a primary side including a primary winding.

7. The power conversion circuit of claim 6, further comprising a primary switch coupled to the primary winding, the primary switch configured to selectively couple and decouple the primary winding to an input voltage terminal of the flyback transformer.

8. The power conversion circuit of claim 6, wherein the flyback transformer is configured to generate a high voltage as the auxiliary winding voltage in event the flyback transformer generates the second flyback voltage at the output terminal.

9. The power conversion circuit of claim 1, wherein the flyback transformer is configured to generate a low voltage as the auxiliary winding voltage in event the flyback transformer generates the first flyback output voltage at the output terminal.

10. A power conversion circuit comprising:
    a flyback transformer including a primary winding, a secondary winding, and a first auxiliary winding and a second auxiliary winding coupled to primary side circuitry, the flyback transformer configured to generate each of a first flyback voltage and a second flyback voltage at an output terminal of the flyback transformer, wherein the first flyback voltage is lower than the second flyback output voltage; and
    a primary bias circuit coupled to a primary side of the transformer; the primary bias circuit configured to:
    use a first voltage from the first auxiliary winding as a first bias voltage for the primary bias circuit in event the flyback transformer is generating the first flyback voltage; and
    use a second voltage from the second auxiliary winding as a second bias voltage for the primary bias circuit in event the flyback transformer is generating the second flyback voltage.

11. The power conversion circuit of claim 10, wherein the primary bias circuit comprises a comparator, the comparator including an inverting input connection and a non-inverting input connection, the comparator configured to:
    receive the first voltage from the first auxiliary winding at the inverting input;
    compare the first voltage from the first auxiliary winding with a reference voltage received at the non-inverting input; and
    output one of a first comparator output voltage and a second comparator output voltage at a comparator output line based on the comparison.

12. The power conversion circuit of claim 11, further comprising a zener diode coupled to the non-inverting input connection of the comparator, the zener diode configured to output the reference voltage at the non-inverting input connection of the comparator.

13. The power conversion circuit of claim 11, further comprising a gate terminal of a switch coupled to the comparator output line, the switch configured to selectively couple one of the first voltage from the first auxiliary winding or the second voltage from the second auxiliary winding to a primary bias voltage line of the primary bias circuit, the primary bias voltage line providing the primary bias voltage.

14. The power conversion circuit of claim 13, wherein the switch comprises an N-FET, a P-FET, an NPN transistor, a PNP transistor or GaN MOSFET.

15. The power conversion circuit of claim 10, wherein the first voltage from the first auxiliary winding is less than the second voltage from the second auxiliary winding.

16. The power conversion circuit of claim 10, wherein the flyback transformer further comprises a primary winding coupled to the primary side of the flyback transformer and a secondary winding coupled to a secondary side of the flyback transformer.

17. The power conversion circuit of claim 16, further comprising a microcontroller coupled to the primary winding, the microcontroller configured to selectively connect the primary winding to an input voltage terminal of the flyback transformer.

18. The power conversion circuit of claim 10, wherein the flyback transformer is configured to generate the first voltage at the first auxiliary winding in event the flyback transformer generates the first flyback voltage.

* * * * *